E. HAAGN.
THERMOSTATIC REGULATING DEVICE.
APPLICATION FILED JAN. 16, 1914.
1,123,277.
Patented Jan. 5, 1915.
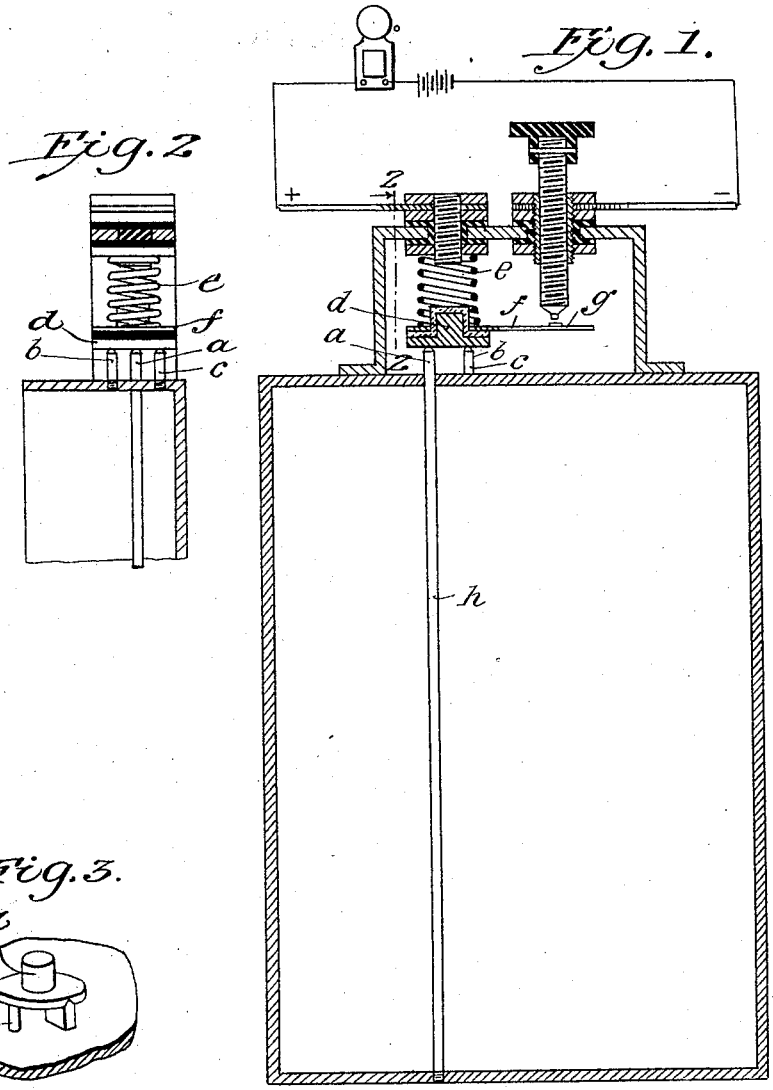

UNITED STATES PATENT OFFICE.

ERNST HAAGN, OF HANAU-ON-THE-MAIN, GERMANY, ASSIGNOR TO THE FIRM OF W. C. HERAEUS, G. M. B. H., OF HANAU-ON-THE-MAIN, GERMANY, A CORPORATION OF GERMANY.

THERMOSTATIC REGULATING DEVICE.

1,123,277.  Specification of Letters Patent.  Patented Jan. 5, 1915.

Application filed January 16, 1914. Serial No. 812,454.

*To all whom it may concern:*

Be it known that I, ERNST HAAGN, a subject of the German Emperor, and resident of Hanau-on-the-Main, Germany, have invented certain new and useful Improvements in or Relating to Thermostatic Regulating Devices, of which the following is a specification.

In connection with thermostatic regulators, it has already been proposed to utilize the expansion of two different bodies under the influence of heat and to transmit their action to an electric contact by means of complicated mechanism.

In contra-distinction to the known devices the present invention has for its object to provide an exceedingly simple transmitting arrangement capable of being readily insulated, exchanged and cleaned, as will be more clearly understood from a description of the accompanying drawing, in which—

Figure 1 is a sectional view of the regulating device. Fig. 2 is a similar view at right angles to Fig. 1. Fig. 3 illustrates a slight modification.

The two bodies whose different expansion is to be utilized are so arranged that one body terminates in one point $a$ and the other body in two points $b$ and $c$ which together constitute a triangle. Located above the three points is a button $d$ provided with three conical indentations precisely fitting the points. In the place of the two points $b$ and $c$ an edge could be used in which instance the button would be provided with one conical indentation and a slot-shaped recess. Such a construction is illustrated in Fig 3. The button is electrically insulated against the transmission mechanism now to be described. As shown, the button is pressed down against the three points by a coil spring $e$ which may simultaneously serve for the supply of the regulating current. In the event of temperature changes in the apparatus, the position of the three points varies with the result that the button is rotated. This rotation is then transmitted in a known manner by means of a lever $f$ to the electric contact $g$.

If the described regulating device is used, for example, to control the temperature of a heating body, the two points $b$ and $c$ as shown in the drawing are set on this body at one side and a rod $h$ of nickel is secured to the opposite side of the body so that its terminal constitutes a third point. The insulation of the button from the spring and from the lever enables the relay current to be taken from the same source of current as the heating current whereby a further simplification is obtained over the known devices hitherto used.

For purposes of illustration the embodiment of the invention illustrated has been shown as adapted to control an electric circuit including an alarm. It will be understood, however, that the invention is not limited to use with such a device and that any suitable form of regulating device or signal means may be controlled by such a circuit.

Having now particularly described and ascertained the nature of my said invention and in what manner the same is to be operated, I declare that what I claim is:

1. In a thermostatic regulator, the combination of two bodies having different coefficients of expansion and each provided with an upwardly extending projection, a circuit closer supported on the upper ends of said projections and projecting laterally therefrom, and a spring holding the circuit closer in position on said projections and permitting it to rock about its connection with one of said members as a fulcrum.

2. In a thermostatic regulator, the combination of two bodies having different coefficients of expansion and each provided with an upwardly extending pointed projection, and a circuit closure supported on the points of said projections and projecting laterally therefrom, whereby it is adapted to rock about its connection with one of the members as a fulcrum.

3. In a thermostatic regulator, the combination of two bodies having different coefficients of expansion, and each provided with an upwardly extending pointed projection, a button-like support having in its lower face recesses receiving the points of said projections, and a circuit closer mounted on said support and projecting laterally therefrom, said button and circuit closer being adapted to rock about one of said point and socket connections as a fulcrum.

4. In a thermostatic regulator, the combination of two bodies having different coefficients of expansion and provided with upwardly extending pointed projections, a circuit closer supported on the points of said projections and projecting laterally therefrom, whereby it is adapted to rock about its connection with one of the members as a fulcrum, and a spring acting to hold the circuit closer on said supporting points.

5. In a thermostatic regulator, the combination of two bodies having different coefficients of expansion and provided with upwardly extending pointed projections, said projections being arranged in triangular form, a circuit closer supported on said projections and adapted to rock about the points forming the base of said triangle, and a spring for holding the circuit closer in position on said supporting points.

In testimony whereof I have signed my name to this specification in the presence of two subscribing witnesses.

ERNST HAAGN.

Witnesses:
 JEAN GRUND,
 CARL GRUND.

Copies of this patent may be obtained for five cents each, by addressing the "Commissioner of Patents, Washington, D. C."